US011752740B2

(12) United States Patent
Silva et al.

(10) Patent No.: US 11,752,740 B2
(45) Date of Patent: Sep. 12, 2023

(54) COMPOSITE STRUCTURE FOR AIRBAG COVER

(71) Applicant: TMG—Tecidos Plastificados e Outros Revestimentos Para a Indústria Automóvel, S.A., V.N. Famalicão (PT)

(72) Inventors: Luis Filipe Silva, Braga (PT); Valério Gonçalves, Póvoa de Lanhoso (PT); Elizabete de Pinho, Oporto (PT)

(73) Assignee: TMG—Tecidos Plastificados e Outros Revestimentos Para a Indústria Automóvel, S.A., V.N. Famalicão (PT)

( * ) Notice: Subject to any disclaimer, the term of this patent is extended or adjusted under 35 U.S.C. 154(b) by 91 days.

(21) Appl. No.: 17/621,936

(22) PCT Filed: Jul. 13, 2020

(86) PCT No.: PCT/EP2020/069759
§ 371 (c)(1),
(2) Date: Dec. 22, 2021

(87) PCT Pub. No.: WO2021/009123
PCT Pub. Date: Jan. 21, 2021

(65) Prior Publication Data
US 2022/0274382 A1    Sep. 1, 2022

(30) Foreign Application Priority Data

Jul. 15, 2019   (EP) .................... 19186260

(51) Int. Cl.
| | |
|---|---|
| *B32B 27/06* | (2006.01) |
| *B29C 48/21* | (2019.01) |
| *B32B 25/08* | (2006.01) |
| *B32B 25/16* | (2006.01) |
| *B32B 27/32* | (2006.01) |
| *B32B 37/15* | (2006.01) |
| *B29K 9/00* | (2006.01) |
| *B29K 23/00* | (2006.01) |
| *B29K 101/12* | (2006.01) |

(52) U.S. Cl.
CPC ............ *B32B 27/065* (2013.01); *B29C 48/21* (2019.02); *B32B 25/08* (2013.01); *B32B 25/16* (2013.01); *B32B 27/32* (2013.01); *B32B 37/153* (2013.01); *B29K 2009/00* (2013.01); *B29K 2023/0633* (2013.01); *B29K 2101/12* (2013.01); *B32B 2305/022* (2013.01); *B32B 2307/54* (2013.01); *B32B 2307/72* (2013.01); *B32B 2605/003* (2013.01)

(58) Field of Classification Search
CPC ............ B29C 48/21; B29K 2023/0633; B29K 2009/00; B29K 2101/12; B32B 2250/03; B32B 2255/10; B32B 2255/26; B32B 2264/0207; B32B 2264/0221; B32B 2307/54; B32B 2307/72; B32B 25/08; B32B 25/16; B32B 2605/003; B32B 2605/08; B32B 27/065; B32B 27/08; B32B 27/20; B32B 27/32; B32B 37/153; B32B 5/18; B32B 7/022; B32B 2305/022
See application file for complete search history.

(56) References Cited

U.S. PATENT DOCUMENTS

2017/0136732 A1   5/2017   Hulsewede et al.
2019/0023215 A1   1/2019   Huelsewede et al.

FOREIGN PATENT DOCUMENTS

DE   102014213974 A1   1/2016
DE   102016206340 A1   10/2017

OTHER PUBLICATIONS

European Patent Office (ISA), International Search Report and Written Opinion dated Aug. 20, 2020, for PCT/EP2020/069759.

*Primary Examiner* — Hai Vo
(74) *Attorney, Agent, or Firm* — Duane Morris LLP

(57) ABSTRACT

The invention provides a composite structure containing a foam layer, an inner layer and an outer layer of a thermoplastic compact cover layer, and a lacquer layer in this order, and having a tensile strength according to DIN EN ISO 527-3 at 2000 mm/min and 23° C. of less than 5 MPa in both a first direction and a second direction perpendicular to the first direction, wherein the density of the foam layer is 40 to 150 kg/m3, the inner layer contains particles of an elastomer (polymer (F)) and at least 50 wt % of a thermoplastic polyolefin (polymer (E)) and is directly bonded to the outer layer, the outer layer differs from the inner layer in its composition and contains the following polymers (A) to (C) in a total amount of 100 parts by weight: 25 to 70 parts by weight of particles of an elastomer (polymer (A)), 0 to 40 parts by weight of a low-density polyethylene (polymer (B)), and 20 to 70 parts by weight of a thermoplastic polyolefin (polymer (C)) other than polymer (B). The invention provides the use of the composite structure in car interiors, in particular as airbag cover, a method for the production of the composite structure.

14 Claims, No Drawings

COMPOSITE STRUCTURE FOR AIRBAG COVER

FIELD OF INVENTION

The present invention concerns a composite structure, a process for producing the composite structure, and the use of the composite structure. The composite structure can be used as a coating for an airbag cover.

BACKGROUND ART

Airbags are integrated in motor vehicles at various points, for example in steering wheels, dashboards, doors, seats and roof linings. For the airbag to function reliably, it is necessary that the cover has material weaknesses as predetermined breaking points in its layers. For optical reasons or because of the design, however, vehicle manufacturers are increasingly demanding that the passenger airbags are invisible.

Film materials can be used as an alternative to airbag cover coatings with material weakening. These film materials must show the required tear behaviour, with the deployment of the airbag taking place within defined timeframes, particle flight being avoided and passenger protection being ensured.

The use of foam laminates for airbag covers is described in DE 10 2014 213 974 A1. The foam film laminate described therein comprises a compact top layer and a foam layer having a density of at least 350 kg/m$^3$ on the underside of the top layer, the top layer comprising an outer layer and an inner layer.

The use of film laminates for airbag covers is also described in DE 10 2016 206 340 A1. The film laminate described there comprises a compact top layer and a foam layer with a thickness in the range of 0.5 to 4 mm and a density of 40 to 200 kg/m$^3$ on the underside of the top layer, whereby the top layer can be a two-ply layer. Additives such as polar polymers or microspheres are incorporated into the compact top layer to reduce the tensile strength. Such additives may have adverse effects on other properties such as softness and haptics.

PROBLEMS TO BE SOLVED BY THE INVENTION

The prior art does not disclose any composite structures having good properties as airbag covers such as a low tensile strength on the one hand and being soft and flexible on the other hand.

Therefore, the problem underlying the present invention is to provide a composite structure having an improved combination of properties such as tearing properties, flexibility, and haptics for the use as an airbag cover.

SUMMARY OF THE INVENTION

The problem was solved by providing a composite structure according to the attached patent claims.

The subject matter of this invention is in particular defined in the following points [1] to [15]:

[1] A composite structure containing a foam layer, an inner layer and an outer layer of a thermoplastic compact cover layer, and a lacquer layer in this order, and having a tensile strength according to DIN EN ISO 527-3 at 2000 mm/min and 23° C. of less than 5 MPa in both a first direction and a second direction perpendicular to the first direction, wherein the density of the foam layer is 40 to 150 kg/m$^3$, the inner layer contains particles of elastomer (polymer (F)) and at least 50 wt % of thermoplastic polyolefin (polymer (E)) other than low-density polyethylene and is directly bonded to the outer layer, the outer layer differs from the inner layer in its composition and contains the following polymers (A) to (C) in a total amount of 100 parts by weight:

25 to 70 parts by weight of particles of elastomer (polymer (A)),
0 to 40 parts by weight of low-density polyethylene (polymer (B)), and
20 to 70 parts by weight of thermoplastic polyolefin (polymer (C)) other than polymer (B).

Preferably, the polymers (A) to (C) make up at least 90 wt %, more preferably 100 wt % of the total polymer content in the outer layer.

The total of 100 parts by weight of polymers (A) to (C) preferably makes up 50 to 100 wt %, more preferably 70 to 100 wt % of the outer layer. Other components may be additives, in particular compounds other than organic polymers, such as those mentioned below.

[2] The composite structure according to point [1], wherein the total of 100 parts by weight of polymers (A) to (C) consists of 25 to 70 parts by weight of polymer (A), 0 to 20 parts by weight of polymer (B), and 30 to 65 parts by weight of polymer (C).

More preferably, the total of 100 parts by weight of polymers (A) to (C) consists of 35 to 70 parts by weight of polymer (A), 0 parts by weight of polymer (B), and 30 to 65 parts by weight of polymer (C).

[3] The composite structure according to point [1], wherein the total of 100 parts by weight of polymers (A) to (C) consists of 25 to 50 parts by weight of polymer (A), 20 to 40 parts by weight of polymer (B), and 20 to 45 parts by weight of polymer (C).

[4] The composite structure according to any one of the preceding points, wherein the particles of elastomer (polymer (A)) consist of 80 to 100 wt % of EPDM and 0 to 20 wt % of EPR.

[5] The composite structure according to any one of the preceding points, wherein the inner layer contains the following polymers (D) to (F) in a total amount of 100 parts by weight:

5 to 35 parts by weight of particles of elastomer (polymer (F)),
10 to 30 parts by weight of linear low-density polyethylene (polymer (D)) and
40 to 80 parts by weight of thermoplastic polyolefin (polymer (E)) other than polymer (D).

In other words, polymer (E) in this preferred embodiment is a polymer other than linear low-density polyethylene and other than low-density polyethylene.

Preferably, the inner layer contains less than 5 wt % of LDPE. More preferably, the polymers (D) to (F) make up 100 wt % of the total polymer content in the inner layer. Other components may be additives.

The following embodiment [5-1] of the present invention is particularly preferred:

A composite structure containing a foam layer, an inner layer and an outer layer of a thermoplastic compact cover layer, and a lacquer layer in this order, and having a tensile strength according to DIN EN ISO 527-3 at 2000 mm/min and 23° C. of less than 5 MPa in both a first direction and a second direction perpendicular to the first direction, wherein the density of the foam layer is 40 to 150 kg/m$^3$, the inner layer is directly bonded to the outer layer, the inner layer contains the following polymers (D) to (F) in a total amount of 100 parts by weight:

- 5 to 35 parts by weight of particles of elastomer (polymer (F)),
- 10 to 30 parts by weight of linear low-density polyethylene (polymer (D)) and
- 40 to 80 parts by weight of thermoplastic polyolefin (polymer (E)) other than polymer (D) and other than low-density polyethylene, and the outer layer contains the following polymers (A) to (C) in a total amount of 100 parts by weight:

- 25 to 70 parts by weight of particles of elastomer (polymer (A)),
- 0 to 40 parts by weight of low-density polyethylene (polymer (B)), and
- 20 to 70 parts by weight of thermoplastic polyolefin (polymer (C)) other than polymer (B).

Preferably, the polymers (D) to (F) make up at least 90 wt % of the total polymer content in the inner layer and the polymers (A) to (C) make up at least 90 wt % of the total polymer content in the outer layer. In [5-1], polymers (E) and (C) are each preferably based on polypropylene, and polymers (A) and (F) are each preferably based on EPDM or EPR.

[6] The composite structure according to any one of the preceding points, wherein the weight content, i.e. the weight concentration, of particles of an elastomer in the outer layer is higher than in the inner layer. This means that the content of polymer (F) in the inner layer is lower than the content of polymer (A) in the outer layer.

In a preferred embodiment, the composite structure has the features of points [1] and [6] above and is additionally characterized in that the content of the elastomer, in particular the content of ethylene propylene diene monomer, in the inner layer is lower than in the outer layer. Thus, the outer layer is softer than the inner layer. In particular, the composite structure has the features of points [1] and [6] above and is additionally characterized in that the Shore A hardness of the outer layer is lower than that of the inner layer, which has a Shore A hardness of 75 to 95.

In one embodiment of point [6], the particles of an elastomer (polymer (A)) consist of 80 to 100 wt % of ethylene propylene diene monomer (EPDM) rubber and 0 to 20 wt % of ethylene propylene rubber (EPR), and the particles of elastomer (polymer (F)) in the inner layer consist of 50 to 80 wt % of EPR and 20 to 50 wt % of EPDM, characterized in that the content of EPDM rubber in the inner layer is lower than in the outer layer.

[7] The composite structure according to any one of the preceding points, wherein the outer layer of the cover layer is 1.5 to 3.0 times thicker than the inner layer. In a preferred embodiment, the outer layer is two times thicker than the inner layer. In that case, it is preferred that the outer layer consists of two sub-layers of identical composition.

[8] The composite structure according to any one of the preceding points, wherein the thickness of the foam layer is more than 2.0 mm. Preferably, the thickness of the foam layer is more than 2.5 mm in the composite structure according to any one of the preceding points. Preferably, the thickness of the cover layer is less than 0.6 mm and the thickness of the foam layer is more than 2.5 mm.

[8] The composite structure according to any one of the preceding points, wherein the gel content of the cover layer is 5 to 20%.

[9] The composite structure according to any one of the preceding points, wherein the Shore A hardness of the outer layer is lower than that of the inner layer, which has a Shore A hardness of 75 to 95.

[10] The composite structure according to any one of the preceding points, wherein the Shore A hardness of the outer layer is less than 75. In a preferred embodiment, the Shore A hardness of the inner layer is 75 to 95, and the Shore A hardness of the outer layer is less than 75.

[11] The composite structure according to any one of the preceding points, wherein the foam density [$g/m^3$] multiplied by the foam thickness [mm] is in the range of 150 to 350, preferably 150 to 250.

[12] The composite structure according to any one of the preceding points, which is an airbag cover.

[13] The use of the composite structure described in any one of points [1] to [12] for interior parts of cars.

[14] A method for producing a composite structure of any one of points [1] to [12] comprising a step (a) of preparing a molten mixture of a first raw material composition containing 100 parts by weight of the following components: 50 to 95 parts by weight of thermoplastic vulcanizate, 0 to 40 parts by weight of low-density polyethylene, and 0 to 20 parts by weight of thermoplastic polyolefin other than low-density polyethylene; a step (b) of preparing a molten mixture of a second raw material composition containing at least 50 wt % of a thermoplastic polyolefin other than low-density polyethylene and particles of elastomer; a step (c) of coextruding the molten mixtures obtained in steps (a) and (b) to obtain the layers of the cover layer; and a step (d) of laminating the layers of the cover layer on a foam layer having a density of 40 to 150 $kg/m^3$.

[15] The method of point [14], wherein the thermoplastic vulcanizate comprises an ethylene propylene diene monomer rubber and polypropylene.

ADVANTAGES OF THE INVENTION

The composite structure according to the invention has a tearing behaviour that meets the requirements for airbags without the composite structure having to be weakened by using perforation lines or adding weakening components such as microspheres. The composite structure can even be used for airbags having more demanding geometries, such as U-shape.

The composite structure represents a cost-effective alternative to the high-priced PVC or PUR materials with spacer materials. In particular, the sewability of the composite structure for the use in airbags having H-shape geometry allows it to be used as an alternative to prior art materials. The composite structure shows a low wrinkle formation, which makes it easier to handle and, in particular, makes sewing easier. In preferred embodiments, the composite structure can be processed by thermoforming.

A further advantage is the easy recyclability of the composite structure since polyolefins that can be used in the foam layer and the cover layer belong to the same family of compounds.

EMBODIMENTS OF THE INVENTION

The composite structure according to the invention is preferably suitable as a tearable cover for an airbag cover. This means that the composite structure is located in an area of the airbag cover where the predetermined breaking point of the cover is located. When the airbag is triggered, i.e.

when an airbag is fired, this predetermined breaking point breaks and causes the composite structure to tear.

To be suitable as an airbag cover, the composite structure has a tensile strength according to DIN EN ISO 527-3 at 2000 mm/min and 23° C. of less than 5 MPa in both a first direction and a second direction perpendicular to the first direction.

Furthermore, the composite structure preferably has a resistance to tear according to ISO-34-1 of less than 25 N/mm, more preferably less than 15 N/mm in both a first direction and a second direction perpendicular to the first direction.

In a preferred embodiment, the composite structure has a tensile strength of less than 5 MPa and a resistance to tear of less than 25 N/mm.

In the present invention, the term "a first direction and a second direction perpendicular to the first direction" means that the first direction may be selected arbitrarily on a given sample. If the extrusion direction is known or can be identified on a given sample, the first direction is the lengthwise direction, i.e. the direction in extrusion direction. Accordingly, the second direction is the direction crosswise to the extrusion direction.

In order to be suitable for sewing, it is important that the composite structure according to the invention has a suitable stitch tear-out force. This is preferably at least 40 N according to DIN EN ISO 23910.

The foam layer, the cover layer, and the lacquer layer of the composite structure are thermoplastic. The composite structure is preferably thermoformable. In that case, it can be processed by thermoforming such as positive of negative vacuum thermoforming.

In the present invention, the term "thermoplastic" denotes polymers or polymer compositions that show thermoplastic properties, in particular thermoreversibility.

The cover layer of the composite structure preferably has a grain, i.e. a three-dimensionally structured surface on the top side covered with lacquer. The grain may be present in the cover layer only or both in the cover layer and the lacquer layer.

The compositions of the foam layer and/or compact layer may contain additives such as stabilizers (light or aging), antioxidants, metal deactivators, processing aids, waxes, fillers (silica, $TiO_2$, $CaCO_3$, $Mg(OH)_2$, carbon black, mica, kaolin, clay, coal dust, lignin, talc, $BaSO_4$, $Al(OH)_3$, ZnO, and MgO), and/or colorants.

An essential feature of the composite structure of the present invention is the low tensile strength as defined herein. While a low tensile strength is achieved by using specific additives in DE 10 2016 206 340 A1 (DE'340), this desired property is achieved by a combination of structural elements and materials in the present invention. The composite structure of the present invention differs from the structures disclosed in DE'340 in the composition of the compact layer, particularly the inner layer. As shown by the data summarized in Table 1 below, the TPV content should be high, but not too high, to meet the compositional requirements for the outer layer. It is advantageous to use either a high content of TPV (Example 1) or a lower content of TPV together with LDPE (Examples 2 to 5). These preferred embodiments are defined in claims 2 and 3. Regarding the inner layer, the low content of TPO disclosed in DE'340 has to be increased to achieve the desired low tensile strength, as shown in Examples 1 and 5. In addition, Examples 1 to 5 use either LLDPE or LDPE, while DE'340 discloses the use of both or none of these polymers.

Composite structures of the present invention can be obtained by starting from the structures of DE'340. For instance, the structure of Example 1(V) of DE'340 can be used as a starting point. The content of TPV in the inner layer of this structure can be partly replaced with TPO and LLDPE to obtain a composite structure of the present invention. The structure of Example 5(V) of DE'340 can also be used as a starting point. The content of LDPE in the inner of this structure can be reduced and TPV can be added to obtain a composite structure of the present invention.

Foam Layer

The composition of the foam layer is not restricted. The foam layer may consist of or contain polyolefin foam. As an alternative, the foam layer may consist of or contain PVC foam. The foam layer consists of or contains polypropylene foam (PP foam) in a preferred embodiment. Polypropylene (PP) is defined here as polymers or copolymers whose proportion by weight of propylene is greater than 50% by weight.

The polyolefin of the foam layer may contain common additives such as lubricants, stabilizers, fillers such as inorganic fillers, and/or pigment.

The preferred polypropylene may be selected from the group consisting of polypropylene, polypropylene-ethylene copolymer, metallocene polypropylene, metallocene polypropylene-ethylene copolymer, polypropylene-based polyolefin plastomer, polypropylene-based polyolefin elastomer, polypropylene-based polyolefin elastomer, polypropylene-based polyolefin elastomer, polypropylene-based thermoplastic polyolefin blend and polypropylene-based thermoplastic elastomer blend. Polypropylene-based thermoplastic polyolefin blend is homopolypropylene and/or polypropylene-ethylene copolymer and/or metallocene homopolypropylene.

The foam layer may have a thickness of 1.0 to 5.0 mm. Preferably, the thickness of the foam layer is more than 2.5 mm, in particular 2.5 to 4.0 mm. The density of the foam layer is 40 to 150 kg/m$^3$, preferably 40 to 100 kg/m$^3$ and more preferably 50 to 80 kg/m$^3$. The higher the density of the foam, the higher is its strength. To achieve the properties desired for the invention, the preferred values of density and thickness of the foam layer have to correlate. Overall, however, the foam layer has a very low density. This is also reflected in the product of the density (in kg/m$^3$) and the thickness (in mm) of the foam layer. The foam density [g/m$^3$] multiplied by the foam thickness [mm] is preferably 150 to 350, more preferably 150 to 250.

In one embodiment, a foam density of more than 70 to 150 kg/m$^3$, preferably 80 to 150 kg/m$^3$ is particularly suitable for the use of the composite structure in airbags having U-shape geometry. Such a foam density is particularly preferred in a composite structure described in point [3] above, i.e. in a structure having a high content of LDPE.

A measure of the softness of the foam layer is the gel content. The gel content is an indication of the degree of crosslinking of the polymer. The lower the gel content, the softer the foam layer. The foam layer used in the composite structure according to the invention preferably has a gel content of 20 to 80%, more preferably 30 to 60% and most preferably 40 to 60%.

The foamed layer is preferably formed by foam extrusion. The layer is produced by blowing a blowing agent, in particular an inert gas, into the molten plastic during the extrusion process above the melting temperature and loading the molten material with a blowing agent under overpressure, and then depressurizing this gas-containing molten material on leaving the extrusion plant and cooling it below the melting temperature. The layer of foamed plastic is thus produced by blowing a blowing agent under overpressure into a polymer melt during the extrusion process and then releasing the pressure of the blowing agent under overpressure. For example, inert gases can be used as blowing agents, possibly in combination with each other. The foam material can then be bonded, e.g. thermally, to the compact two-layer top layer in the form of a flat material, so that a multi-layer film with a foamed layer is formed. It is also possible to first join the foam layer with the inner layer and then apply the outer layer to the inner layer.

The foam contained in the foam layer can be open-cell or closed-cell. Particularly in the production of PP foam as webs, the cell structure on the surfaces differs from the rest of the homogeneous structure. In particular, the surfaces have harder, closed-cell areas. This results in different physical properties, such as different elongation and flexibility, but also different haptics. By carrying out a process called skiving, the lower and/or upper surface layer of the sheet may be processed to obtain a sheet which contains the homogeneously cell-structured core area of the foam. The use of such a foam has the advantage that the material of another layer or an adhesive can penetrate into the open cells in the connection area with another layer, and the anchoring obtained in this way can achieve a stronger connection. Skiving in the seam area can be performed with a sharpening machine, e.g. FORTUNA NG6. This process also has a very positive effect on the avoidance of creases when handling the material during the sewing process. The properties of the composite structure are selected in such a way that sufficient seam strength according to DIN ISO 23910 is achieved without the need for an extra sewing aid, e.g. a thin textile. The seam strength is determined among other things by the thickness and structure of the composite structure.

Examples of polyolefins and their production are disclosed in U.S. Pat. No. 9,260,577B2.

These polyolefins comprise 15 to 75 parts by weight of an olefin block copolymer and 25 to 85 parts by weight of a polymer based on polypropylene and have a degree of crosslinking of 20 to 75%. These polyolefins preferably contain closed cells.

For example, the degree of crosslinking may be 30 to 50%, with 3 to 4 parts by weight of divinylbenzene crosslinker per 100 parts by weight of resin.

These polyolefins can be produced according to U.S. Pat. No. 9,260,577B2 and have the following properties:

|  | Properties of preferred polyolefins | Properties of particularly preferred polyolefins | Properties of particularly preferred polyolefins |
| --- | --- | --- | --- |
| Compression strength according to JIS K6767 [kgf/cm$^2$] | 0.2-1.0 | 0.3-0.6 | 0.75-0.85 |
| Density [kg/m$^3$] according to JIS K6767 | 20-250 | 30-100 | 65-75 |
| Shore A according to ASTM D2240 | 30-90 | 45-65 | 70-75 |
| VDA 237-101 Section (Annex) 1 | 1.0-3.2 | 1.0-2.8 | 2.3-2.5 |

The standards listed in the table above and the test methods are explained in U.S. Pat. No. 9,260,577B2.

The Cover Layer

The cover layer is compact, i.e. not foamed. The density of the cover layer is preferably higher than 800 kg/m$^3$ and more preferably higher than 850 kg/m$^3$. This applies to each sublayer independently. This means that the inner layer and the outer layer each has a density of preferably higher than 800 kg/cm$^3$.

The cover layer is thermoplastic. This property requires that the overall degree of crosslinking is not too high. The gel content is preferably less than 20%, more preferably less than 15%. The gel content may be 5 to 20%.

The cover layer comprises at least two sublayers, i.e. an inner layer and an outer layer directly bonded to each other. The direct bonding excludes an additional layer or adhesive layer between them.

Preferably, the Shore A hardness of the outer layer is lower than that of the inner layer having a Shore A hardness of 75 to 95. More preferably, the Shore A hardness of the inner layer is 80 to 95 and the Shore A hardness of the outer layer is 60 to 75.

The thickness of the cover layer is preferably 0.2 to 1 mm, more preferably 0.2 to 0.7 mm and even more preferably 0.3 to 0.6 mm. The sublayers can have the same or different thickness. The outer layer may be thicker, preferably 1.5 to 3.0 times thicker, than the inner layer. In a preferred embodiment, the cover layer has a total thickness of 0.3 to 0.6 mm and consists of the inner layer and the outer layer, which has a thickness of 0.2 to 0.4 mm and is two times thicker than the inner layer.

In a preferred embodiment, the compact cover layer covers all compact layers between the top lacquer layer and the foam layer. In that case, the cover layer is bonded directly to the foam layer.

In other embodiments, an adhesive layer and/or a textile layer may be arranged between the foam layer and the cover layer. In one embodiment, a textile layer is arranged between the foam layer and the cover layer. In that case, it is preferred that an adhesive layer is used to bond the textile layer to the foam layer and the cover layer. Hence, the composite structure according to the invention may contain a foam layer, an adhesive layer, a textile layer, an adhesive layer, a cover layer, and a lacquer layer in this order. The textile layer affects the properties of the composite structure, e.g. tensile strength, resistance to tear, elongation at break, wrinkle formation, and thermoformability. The composite structure according to this embodiment is suitable for being processed by cutting and sewing.

The Inner Layer

The inner layer contains at least 50 wt % of a thermoplastic polyolefin (polymer (E)) and particles of an elastomer (polymer (F)).

In a preferred embodiment, the inner layer contains the following polymers (D) to (F) in a total amount of 100 parts by weight: 5 to 35 parts by weight of particles of an elastomer (polymer (F)); 10 to 30 parts by weight of a linear low-density polyethylene (polymer (D)); and 40 to 80 parts by weight of a thermoplastic polyolefin (polymer (E)) other than polymer (D).

The Outer Layer

The outer layer contains the following polymers (A) to (C) in a total amount of 100 parts by weight: 25 to 70 parts by weight of particles of an elastomer (polymer (A)); 0 to 40 parts by weight of a low-density polyethylene (polymer (B)); and 20 to 70 parts by weight of a thermoplastic polyolefin (polymer (C)) other than polymer (B).

In one embodiment of the composite structure, the total of 100 parts by weight of polymers (A) to (C) consists of 25 to 70 parts by weight of polymer (A), 0 to 20 parts by weight of polymer (B), and 30 to 65 parts by weight of polymer (C). This composite structure is particularly suitable for being processed by cutting and sewing.

In another embodiment of the composite structure, the total of 100 parts by weight of polymers (A) to (C) consists of 25 to 50 parts by weight of polymer (A), 20 to 40 parts by weight of polymer (B), and 20 to 45 parts by weight of polymer (C). This composite structure is particularly suitable for being processed by thermoforming.

The melting point and the Shore A hardness of the outer layer are mainly determined by the properties of the TPV. The melting point of the TPV is preferably in the range of 100 to 180° C., more preferably 110 to 170° C. In a preferred embodiment, more than 50 wt % of the TPV used for the preparation of the outer have a melting point of higher than 140° C., more preferably higher than 150° C. Hence, the melting point of the outer layer is preferably higher than 140° C., more preferably higher than 150° C. The Shore A hardness of the TPV is preferably in the range of 30 to 95, more preferably 40 to 90. In a preferred embodiment, more than 50 wt % of the TPV used for the preparation of the outer layer have a Shore A hardness of less than 70, more preferably less than 60. Hence, the hardness Shore of the outer layer is preferably less than 75, more preferably less than 70.

In the composite structure of the present invention, the total of 100 parts by weight of polymers (A) to (C) preferably (i) consists of 25 to 70 parts by weight of polymer (A), 0 to 20 parts by weight of polymer (B), and 30 to 65 parts by weight of polymer (C), and more preferably (ii) consists of 35 to 50 parts by weight of polymer (A), 0 parts by weight of polymer (B), and 50 to 65 parts by weight of polymer (C), or (iii) consists of 25 to 40 parts by weight of polymer (A), 20 to 40 parts by weight of polymer (B), and 25 to 45 parts by weight of polymer (C).

In a specific embodiment, the composite structure of the present invention contains an outer layer (iv) having a melting point of higher than 135° C., preferably (v) having a melting point of higher than 140° C. and a Shore A hardness of less than 75, more preferably (vi) having a melting point of higher than 150° C. and a Shore A hardness of less than 70.

In a more preferred embodiment, the composite structure has a combination of above features (i) and (iv), (i) and (v), (i) and (vi), (ii) and (iv), (ii) and (v), (ii) and (vi), (iii) and (iv), (iii) and (v), or (iii) and (vi). The composite structures having features (i) or (ii) are particularly suitable for being processed by cutting and sewing.

Polymers (A) to (F) contained in the compact layer will be described in the following.

Polymers (A) and (F): Elastomer

Polymers (A) and (F) are elastomers having the shape of particles. The particles are preferably embedded in a matrix of the other polymers present in the layer. The particle size is preferably below 10 μm, more preferably below 1 μm. Preferably, at least 90% of the particles have a size of less than 10 μm. The size can be determined by scanning electron microscopy (SEM) of a cross section of the layer. The longest diameter of a particle image in an SEM micrograph is defined as its size.

Polymers (A) and (F) are selected independently from each other and may be the same or different.

In the present invention, the terms "elastomer" and "rubber" are used synonymously. They denote polymers that show elastic properties and are crosslinked. Their gel content is preferably between 1% and 50%, more preferably between 2% and 50%, even more preferably between 5% and 50%.

The rubber component contained in the composite structure according to the present invention is preferably contained in a thermoplastic vulcanizate (TPV), which can be used as a raw material for producing the composite structure, as discussed below.

The rubber may be selected from the group consisting of natural rubber (NR), nitrile butadiene rubber (NBR), hydrogenated nitrile butadiene rubber (HNBR), carboxylated nitrile rubber (XNBR), butyl rubber (IIR), chlorobutyl rubber (CIIR), bromobutyl rubber (BIIR), polychloroprene (CR), styrene-butadiene rubber (SBR), polybutadiene (BR), ethylene-propylene-diene tripolymer (EPDM), ethylene-propylene rubber (EPR or EPM), silicone rubber, acrylic rubber (ACM), ethylene-vinylacetate copolymer rubber (EVM), polyurethane rubber (PU), and any combination of the above. The rubber can also be a styrene based thermoplastic elastomer (STPE).

In particular, the rubber may be selected from the group comprising ethylene/α-olefin copolymer rubber (EAM) as well as ethylene/α-olefin/diene terpolymer rubber (EADM). Preferably the diene in the ethylene-α-olefin-diene rubber is preferably a nonconjugated diene. Suitable non-conjugated dienes include dicyclopentadiene, alkyldicyclopentadiene, 1,4-pentadiene, 1,4-hexadiene, 1,5-hexadiene, 1,4-heptadiene, 2-methyl-1,5-hexadiene, cyclooctadiene, 1,4-octadiene, 1,7-octadiene, 5-ethylidene-2-norbornene, 5-n-propylidene-2-norbornene, and 5-(2-methyl-2-butenyl)-2-norbornene. In preferred embodiments, the rubber component comprises an ethylene-α-olefin-diene rubber. The ethylene-α-olefin-diene rubber may comprise an α-olefin having 3 to 8 carbon atoms. The α-olefin in an EAM or EADM rubber is preferably propylene; in such a case the rubber is referred to as EP(D)M. Here, EPM may also be referred to as EPR. It is also possible to use a mixture of the rubbers mentioned above.

In a preferred embodiment of the present invention, the rubber in the outer layer consists of EPDM and EPR. In that case, EPDM preferably constitutes at least 80 wt % of the total rubber content in the outer layer. It is preferred that EPDM is contained in a TPV raw material and EPR is contained in a TPO raw material.

EPDM is made from ethylene, propylene and a diene comonomer that enables crosslinking via sulphur vulcanization systems. EPDM contains crosslinks and is preferably fully cured, i.e. crosslinked to an extent of at least 98%, most preferably to an extent of 100%. The content of propylene is preferably 45% to 85% by weight. Preferred dienes used in the manufacture of EPDM rubbers are ethylidene norbornene (ENB), dicyclopentadiene (DCPD), and vinyl norbornene (VNB). EPDM is preferably crosslinked via vulcanization with sulphur or by using peroxides. Propylene reduces the formation of the typical polyethylene crystallinity. EPDM is a semi-crystalline material with ethylene-type crystal structures at higher ethylene contents, becoming essentially amorphous at ethylene contents that approach 50 wt %. EPDM may be compounded with fillers such as carbon black and calcium carbonate, and with plasticizers such as paraffinic oils.

EPR (also referred to as "EPM") is a random copolymer of ethylene and propylene. EPR is similar to EPDM but contains no diene units. It is crosslinked using radical methods such as peroxides. EPR of different properties can be obtained by varying the monomer ratios. These properties are e.g. viscosity or crystallinity. EPR having from amorphous to semi-crystalline structure can be obtained. EPR preferably comprises 40 to 80 wt %, more preferably 40 to 60 wt % of ethylene units. EPR copolymers containing less than about 40 wt % ethylene generally are known to have poor elasticity at low temperatures, and thus may provide compositions that are too rigid and lack the balance of mechanical properties over a wide temperature range needed for most automotive applications. At high levels of ethylene, generally above about 60 wt % ethylene units, separate crystalline ethylene domains may form within the rubber component, and interphase adhesion and miscibility are reduced. EPR may be contained in a thermoplastic resin composition in an amount of 10 to 60 wt %, preferably 15 to 40 wt %. Resins with less than 10 wt % of EPR are more rigid and less flexible. The presence of the rubber component at high levels above about 60 wt % decrease stiffness and tensile strength.

Polymers (C) and (E): Thermoplastic Polyolefin

The thermoplastic polyolefin (TPO) of the inner layer and the TPO of the outer layer, i.e. polymers (C) and (E), are selected independently from each other and may be identical or different from each other.

The degree of crosslinking in thermoplastic polyolefins is low. Their gel content is preferably less than 5%, more preferably less than 2%.

Thermoplastic polyolefins (TPO) are polymers produced from alkenes such as ethylene, propylene, 1-butene or isobutene by chain polymerization. They are semi-crystalline thermoplastic polymers that are easy to process. Examples of TPO are polyethylene (PE), polypropylene (PP), polymethylpentene (PMP), polyisobutylene (PIB) and polybutylene (PB, polybutene-1). Polyethylene (PE) is defined here as polymers or copolymers whose proportion by weight of ethylene is more than 50 wt %. Polypropylene (PP) is defined here as polymers or copolymers whose proportion by weight of propylene is more than 50 wt %. In the present invention, the term "based on" has the meaning of "containing at least 50 wt %". For instance, a TPO based on PP is a blend of polymers containing at least 50 wt % of PP. Examples of TPO are blends of polyethylene (PE) and polypropylene (PP). Examples of PE are HDPE, LDPE and LLDPE. HDPE has weakly branched polymer chains and therefore has a high density between 0.94 $g/cm^3$ and 0.97 $g/cm^3$. LDPE and LLDPE are described below. The properties of TPO can be influenced by the addition of elastomers or other substances such as talcum.

Depending on its composition, TPO can be produced hard or soft. Hard TPO, for example, consists of 75% PP and talcum. Soft TPO has a significantly higher elastomer content, which may be up to 70%. Thermoplastic elastomers can be added to adjust the properties. These are also thermoplastics, which behave rubber-elastically in the range of normal service temperatures but can be processed like thermoplastics at higher temperatures. Different mixing ratios and admixtures give the desired properties. For example, a polyolefin elastomer made of polypropylene (PP) and natural rubber (NR) covers a wide range of hardness depending on the quantity ratio.

Examples of TPO are blends of ethylene propylene diene rubber (EPDM) with polyethylene (PE) and/or polypropylene (PP), blends of ethylene propylene rubber (EPM) with polypropylene (PP) and/or polyethylene (PE) and ethylene propylene blends. The TPO composition may contain elastomers such as EPR or EPDM, as described above, to such an extent and having such a degree of crosslinking that the composition is still thermoplastic.

In the present invention, the TPO is preferably based on PP and contains one of EPDM (preferably not crosslinked), POE (polyolefin elastomer) and OBC (olefin block copolymer). POE is preferably an ethylene elastomer.

In one embodiment of the present invention, the resin components of polymer (E) consist of 50 to 90 wt % of polypropylene and correspondingly 10 to 50 wt % of EPR, preferably 60 to 85 wt % of PP and correspondingly 15 to 40 wt % of EPR.

Thermoplastic Vulcanizate (TPV)

Thermoplastic vulcanizate (TPV) is part of the thermoplastic elastomer (TPE) family of polymers. A thermoplastic elastomer is defined as an elastomer comprising a thermoreversible network. TPE is a copolymer or a physical mix of polymers, e.g. a plastic and a rubber, that consists of materials with both thermoplastic and elastomeric properties. TPV as one class of TPE combines the characteristics of vulcanized rubber with the processing properties of thermoplastics. TPV contains rubber particles cured by vulcanization. The rubber particles encapsulated in a thermoplastic matrix.

In the present invention, the rubber particles are made of the rubber described above, and the thermoplastic matrix is made of TPO described above. The resin components of TPV may consist of 10-90 parts by weight of the polyolefin resin and correspondingly 90-10 parts by weight of the rubber, preferably 10-80/80-20 parts by weight, and more preferably 30-70/70-30 parts by weight. In the present invention, a TPV based on polypropylene (PP) and EPDM rubber or PP and EPR is preferred. Typical TPVs are disclosed in DE 10 2016 206 340 A1 and consist of 33 wt % of polypropylene, 33 wt % of ethylpropyl rubber and 33 wt % of EPDM or 50 wt % of polypropylene and 50 wt % of EPDM.

The polyolefin contained in the TPV is polymer (A) or polymer (F), each which can be identical to or different from the TPO otherwise contained in a layer, e.g. polymer (B) or polymer (C). For instance, PP contained in a layer may be derived from TPO added as polymer (C) and, in addition, from the matrix polymer of TPV, in which PP and rubber is contained e.g. in equal amounts. Hence, in a preferred composite structure of the invention the polymer (A) is ethylene propylene diene monomer rubber and at least part of polymer (C) is polypropylene, which is contained in an amount equal to or higher than the amount of polymer (A).

The TPV can either be prepared by mixing the polyolefin with a particulate form of the vulcanized rubber or via a process known as dynamic vulcanization. Dynamic vulcanization consists of intimately mixing a blend of compatible polymers, then introducing a crosslinking system in the mixture while the mixing process is continued. The mechanical performance of TPV improves with the degree of crosslinking of the rubbery phase and with the inverse of the particle size of rubbery domains. The particle size of the vulcanized rubber is preferably below 10 µm, more preferably below 1 µm. TPV can be processed using conventional thermoplastic processes such as injection molding, blow molding and extrusion.

TPV may be compounded with additives described below. In particular, the TPV may contain different ingredients such as reinforcing fillers (carbon black, mineral fillers), stabilizers, plasticizing oils, and curing systems.

Polymers (B) and (D): Low-Density Polyethylene (LDPE) and Linear Low-Density Polyethylene (LLDPE)

LDPE is a thermoplastic c made from the monomer ethylene. It has a density in the range of 0.910-0.940 $g/cm^3$ and preferably a melting point of about 100° C. to about 120° C. LDPE has a high degree of short- and long-chain branching, which means that the chains do not form crystal structures and LDPE confers isotropic properties. This results in a lower tensile strength. The high degree of branching with long chains gives molten LDPE desirable flow properties.

LLDPE is defined by a density range of 0.915-0.925 g/cm³. It is a substantially linear polymer and is made by copolymerization of ethylene with longer-chain olefins. Examples of such olefins are 1-butene, 1-hexene, and 1-octene, which result in short branches in the polymer chain.

LLDPE contains branches derived from comonomers of not longer than 1-octene, whereas LDPE also contains branches derived from longer comonomers. LLDPE has higher tensile strength than LDPE, and it exhibits higher impact and puncture resistance than LDPE. LLDPE shows toughness, flexibility, and relative transparency. LLDPE is less shear sensitive than LDPE because of its narrower molecular weight distribution and shorter chain branching. LLDPE confers melt strength. The linearity of LLDPE results from the different manufacturing processes of LLDPE and LDPE. In general, LLDPE is produced at lower temperatures and pressures by copolymerization of ethylene and alpha-olefins. LLDPE can be advantageous for securing excellent moldability on the basis of an appropriate elongation and securing rigidity to be broken at a certain level of strength or more.

Lacquer Layer

The lacquer layer is applied directly on top of the cover layer as a finish of the composite structure and serves to protect artificial leather from chemical agents, physical damage, e.g. scratches or abrasion, and UV radiation. The surface lacquering can further reduce the surface adhesion of the artificial leather. Conventional lacquers used for artificial leather for the interior of vehicles can be employed. For example, solvent-based or water-based polyurethanes that are crosslinked with isocyanates or have properties for UV curing are suitable. The surface coating is preferably applied over the entire composite structure and completely covers it. The surface coating is formed from at least one layer of lacquer, but can be formed from several layers of lacquer, preferably from one to four layers of lacquer. The surface coating to protect the surface usually consists of one or more, preferably up to four, transparent layers of lacquer. In one embodiment, the surface coating is coloured, e.g. by adding colour pigments to the coating. The surface coating is formed by applying a coating in one or preferably several coats. The varnish is preferably applied by gravure printing, but can also be applied by other methods, such as roller application, spray application or in an embossing step for surface embossing. In one version, the surface coating can be applied in the form of a lacquer layer in a two-stage roller printing process. The surface coating has a thickness in the range of a few micrometers, preferably 1 to 30 µm, more preferably 1 to 20 µm and even more preferably 3 to 10 µm. The lacquer layer is preferably a polyurethane lacquer layer. An example of a surface coating is a coating based on a silicone-containing aliphatic polyurethane. This varnish can be applied in a thickness of 5 µm.

Production Method

The method for producing a composite structure according to the present invention comprises a step (a) of preparing a molten mixture of a first raw material composition containing 100 parts by weight of the following components: 50 to 95 parts by weight of a thermoplastic vulcanizate, 0 to 40 parts by weight of a low-density polyethylene, and 0 to 20 parts by weight of a thermoplastic polyolefin other than the low-density polyethylene; a step (b) of preparing a molten mixture of a second raw material composition containing at least 50 wt % of a thermoplastic polyolefin other than LDPE and particles of an elastomer; a step (c) of coextruding the molten mixtures obtained in steps (a) and (b) to obtain the layers of the cover layer; and a step (d) of laminating the layers of the cover layer on a foam layer having a density of 40 to 150 kg/m³.

The thermoplastic vulcanizate in the first raw material composition preferably comprises and more preferably consists of an EPDM rubber and PP, preferably in a weight ratio of EPDM:PP of 0.5 to 2.0.

The composite structure can be produced by a process involving the following additional steps: (i) coextrusion of TPO layers and thermal lamination to PP foam; (ii) painting the top side and, if applicable, the back side; (iii) embossing to form the grain; (iv) painting the reverse side, if necessary. An alternative procedure consists of the following steps: (i) coextrusion of TPO layers; (ii) painting the top surface; (iii) embossing to form the grain and laminating to PP foam; (iv) painting the reverse side, if necessary.

EXAMPLES

This invention is further illustrated by the following examples.

Measurement Methods

In this invention, the following measurement methods were used to determine the parameters of the composite structure:

(The norms and standards stated in this application refer to the latest versions at the filing date of this application unless otherwise indicated).

Thickness: ISO 1923; Weight: ISO 2286-2:2016; Melting points (DSC): ASTM D 3418-15; elongation at break: ISO 13934-1:99; density: ISO 845; Hardness (Shore A, ShA): DIN 53505; resistance to tear: ISO-34-1; tensile strength: DIN EN ISO 527-3 at 2000 mm/min and 23° C.

Gel content: Gel content measurement is based on ASTM D2765-16. The composite material is weighed (initial weight) and placed in xylene for 24 hours at 180° C., the dissolved material is separated and the weight of the remaining material is determined (final weight); gel content [%]= [(final weight)/initial weight)]×100

The tear properties at airbag deployment were tested at −35° C., 23° C. and 85° C. Evaluation:

++: very good tear properties; the material is suitable for the use as airbag cover +: good tear properties, tearing occurs late; the material is still suitable for the use as airbag cover Example 1

The composite structure of example 1 has the following configuration:

Layer 0: Paint based on silicone-containing aliphatic polyurethane, approx. 5 µm thick Layer 1: compact TPO layer (approx. 130 µm layer thickness)

Layer 2: compact TPO layer (approx. 130 µm layer thickness)

Layer 3: compact TPO layer (approx. 130 µm layer thickness)

Layer 4: polypropylene foam (about 3.5 mm layer thickness)

Layers 1 to 3 correspond to layers AA-B in Table 1.

Examples 2 to 5 and Comparative Examples 1 and 2

The composite structures having configurations shown in Table 1 were prepared as described in Example 1.

Table 1 also shows the results of Examples 1 to 5 and Comparative Examples 1 and 2 as well as the results of composite structures 1(V) and 5(V) of DE 10 2016 206 340 A1 (DE'340).

In Examples 1 to 5 and Comparative Examples 1 and 2, TPV essentially consists of polypropylene and EPDM rubber and TPO is based on polypropylene.

The composite structures of Comparative Examples 1 and 2 do not meet the feature that the inner layer contains at least 50 wt % of a thermoplastic polyolefin (polymer (E)) other than low-density polyethylene.

TABLE 1

|  |  |  |  | Ex. 1 | Ex. 2 | Ex. 3 | Ex. 4 | Ex. 5 | DE'340 1(V) | DE'340 5(V) | Cmp. Ex. 1 | Cmp. Ex. 2 |
|---|---|---|---|---|---|---|---|---|---|---|---|---|
| Cover layer formulation | outer layer (AA) | TPV | pbw | 60; 30 | 65 | 65 | 65 | 65 | 100 | 100 | 60; 30 | 65 |
|  |  |  | mp (° C.) | 157; 119/160 | 119/160 | 119/160 | 119/141 | 119/141 |  |  | 157; 119/160 | 157 |
|  |  |  | ShA | 50; 80 | 80 | 80 | 80 | 80 |  |  | 50; 80 | 50 |
|  |  | LDPE | pbw | — | 35 | 35 | 35 | 35 | — | — | — | 35 |
|  |  | LLDPE | pbw | — | — | — | — | — | — | — | — | — |
|  |  | TPO | pbw | 10 | — | — | — | — | — | — | 10 | — |
|  | inner layer (B) | TPV | pbw | 20 | 20 | 20 | 20 | 20 | 90 | 0 | 65 | 65 |
|  |  |  | mp (° C.) | — | — | — | — | — |  |  | 157 | 157 |
|  |  |  | ShA | — | — | — | — | — |  |  | 50 | 50 |
|  |  | TPO | pbw | 60 | 60 | 60 | 60 | 60 | — | 40 | — | — |
|  |  | LLDPE | pbw | 20 | 20 | 20 | 20 | 20 | — | 20 | — | — |
|  |  | LDPE | pbw | — | — | — | — | — | — | 40 | 35 | 35 |
| Cover layer thickness |  |  | mm | 0.4 | 0.5 | 0.4 | 0.6 | 0.6 | 0.8 | 0.8 | 0.4 | 0.4 |
| Foam density |  |  | kg/m3 | 50 | 100 | 100 | 67 | 100 | 67 | 67 | 50 | 50 |
| Foam thickness |  |  | mm | 3.5 | 2.5 | 2.5 | 2.0 | 2.5 | 2 | 2 | 3.5 | 3.5 |
| Tear property at airbag deployment |  |  |  | ++ |  |  |  |  |  |  | + | + |
| Elongation at break [%] |  | long |  | 264 | 343 | 242 | 469 | 356 |  |  |  |  |
|  |  | cross |  | 165 | 310 | 345 | 282 | 302 |  |  |  |  |
|  |  | ratio (long/cross) |  | 1.6 | 1.1 | 0.7 | 1.7 | 1.2 |  |  |  |  |
| Tensile strength DIN EN ISO 527-3 |  | long |  | 1.07 | 2.13 | 2.37 | 3.30 | 2.35 | 15 | 15 |  |  |
|  |  | cross |  | 1.19 | 2.56 | 2.02 | 2.36 | 2.98 | 18 | 18 |  |  |
|  |  | ratio (long/cross) |  | 0.9 | 0.8 | 1.2 | 1.4 | 0.8 | 0.8 | 0.8 |  |  |
| Resistance to tear ISO 34-1 |  | long |  | 8.6 | 16.9 | 15.4 | 22.3 | 19.6 | 8 | 25 |  |  |
|  |  | cross |  | 8.2 | 16.7 | 16.6 | 17.7 | 18.7 | 11 | 62 |  |  |
|  |  | ratio (long/cross) |  | 1.0 | 1.0 | 0.9 | 1.3 | 1.1 | 0.7 | 0.4 |  |  |

Legend to Table 1:
Ex. = Example; Cmp. Ex. = Comparative Example
AA, B: configuration of the cover layer; layers AA make up ⅔ of the total thickness, layer B makes up ⅓ of the total thickness
pbw = parts by weight; mp = melting point; ShA = Shore A hardness
long = in extrusion direction (lengthwise); cross = perpendicular to extrusion direction (crosswise)

The results show that the composite structures according to the present invention have advantageous properties such as low tensile strength and low resistance to tear. Therefore, the composite structures are suitable for the use as airbag covers. All composite structures are suitable for the use in airbags having H-shape geometry. Airbags having U-shape are more demanding and require a composite structure having isotropic properties resulting in an elongation at break that is similar in lengthwise and crosswise direction. LDPE confers isotropic properties. In addition, the foam density should be higher for the use in U-shaped airbags. Therefore, the composite structures of Examples 2, 3, and 5 are particularly suitable for the use in airbags having U-shape geometry.

The composite structures of Examples 1 to 5 are thermoplastic and can be used in a thermoforming process.

Because of the lower density of the foam layer, the composite structure of Example 1 is particularly suitable for being processed by cutting and sewing.

What is claimed is:
1. A composite structure comprising:
a foam layer,
an inner layer and an outer layer of a thermoplastic compact cover layer, and
a lacquer layer,
wherein the composite structure has a tensile strength according to DIN EN ISO 527-3 at 2000 mm/min and 23° C. of less than 5 MPa in both a first direction and a second direction perpendicular to the first direction,
wherein a density of the foam layer is 40 to 150 kg/m$^3$,
wherein the inner layer contains the following polymers (D) to (F) in a total amount of 100 parts by weight:
5 to 35 parts by weight of particles of an elastomer (polymer (F)),
10 to 30 parts by weight of a linear low-density polyethylene (polymer (D)) and
40 to 80 parts by weight of a thermoplastic polyolefin (polymer (E)) other than polymer (D),
wherein the inner layer is directly bonded to the outer layer,
wherein the outer layer and the inner layer are made of different compositions, and
wherein the outer layer contains the following polymers (A) to (C) in a total amount of 100 parts by weight:
25 to 70 parts by weight of particles of an elastomer (polymer (A)),
0 to 40 parts by weight of a low-density polyethylene (polymer (B)), and
20 to 70 parts by weight of a thermoplastic polyolefin (polymer (C)) other than polymer (B).
2. The composite structure according to claim 1, wherein the total of 100 parts by weight of polymers (A) to (C) consists of 25 to 70 parts by weight of polymer (A), 0 to 20 parts by weight of polymer (B), and 30 to 65 parts by weight of polymer (C).

3. The composite structure according to claim 1, wherein the total of 100 parts by weight of polymers (A) to (C) consists of 25 to 50 parts by weight of polymer (A), 20 to 40 parts by weight of polymer (B), and 20 to 45 parts by weight of polymer (C).

4. The composite structure according to claim 1, wherein the particles of the elastomer (polymer (A)) consists of 80 to 100 wt % of ethylene propylene diene monomer rubber and 0 to 20 wt % of ethylene propylene rubber.

5. The composite structure according to claim 1, wherein the weight content of particles of an elastomer in the outer layer is higher than in the inner layer.

6. The composite structure according to claim 1, wherein the outer layer of the cover layer is 1.5 to 3.0 times thicker than the inner layer.

7. The composite structure according to claim 1, wherein a thickness of the foam layer is more than 2.0 mm.

8. The composite structure according to claim 1, wherein a Shore A hardness of the outer layer is lower than that of the inner layer, and wherein the inner layer has a Shore A hardness of 75 to 95.

9. The composite structure according to claim 1, wherein a Shore A hardness of the outer layer is less than 75.

10. The composite structure according to claim 1, wherein a foam density [g/m$^3$] multiplied by a foam thickness [mm] is in the range of 150 to 350.

11. The composite structure according to claim 1, which is an airbag cover.

12. The composite structure according to claim 1, which is useful as an interior part of cars.

13. A method for producing a composite structure of claim 1 comprising:

a step (a) of preparing a molten mixture of a first raw material composition to form an outer layer containing the following polymers (A) to (C) in a total amount of 100 parts by weight:

25 to 70 parts by weight of particles of an elastomer (polymer (A)), 0 to 40 parts by weight of a low-density polyethylene (polymer (B)), and 20 to 70 parts by weight of a thermoplastic polyolefin (polymer (C)) other than polymer (B);

a step (b) of preparing a molten mixture of a second raw material composition to form an inner layer containing the following polymers (D) to (F) in a total amount of 100 parts by weight:

5 to 35 parts by weight of particles of an elastomer (polymer (F)), 10 to 30 parts by weight of a linear low-density polyethylene (polymer (D)) and 40 to 80 parts by weight of a thermoplastic polyolefin (polymer (E)) other than polymer (D);

a step (c) of coextruding the molten mixtures obtained in steps (a) and (b) to obtain the layers of the cover layer;

a step (d) of laminating the layers of the cover layer on a foam layer having a density of 40 to 150 kg/m$^3$; and a step (e) of providing a lacquer layer on the outer layer of the cover layer.

14. The method of claim 13, wherein the particles of the elastomer comprises an ethylene propylene diene monomer rubber and polypropylene.

* * * * *